(12) United States Patent
Zhao et al.

(10) Patent No.: US 8,738,038 B2
(45) Date of Patent: May 27, 2014

(54) METHOD AND SYSTEM FOR IMPLEMENTING INFORMATION INTERACTION IN A NEXT GENERATION NETWORK

(75) Inventors: Ningxia Zhao, Shenzhen (CN); Mingdong Li, Shenzhen (CN); Qiang Wu, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 113 days.

(21) Appl. No.: 13/259,034

(22) PCT Filed: Apr. 16, 2010

(86) PCT No.: PCT/CN2010/071839
§ 371 (c)(1),
(2), (4) Date: Apr. 25, 2012

(87) PCT Pub. No.: WO2010/145286
PCT Pub. Date: Dec. 23, 2010

(65) Prior Publication Data
US 2012/0202526 A1    Aug. 9, 2012

(30) Foreign Application Priority Data
Oct. 27, 2009    (CN) .......................... 2009 1 0207148

(51) Int. Cl.
*H04W 24/00*    (2009.01)

(52) U.S. Cl.
USPC ...................... 455/456.3; 455/433; 455/456.1

(58) Field of Classification Search
CPC ........ H04W 4/02; H04W 80/04; H04W 64/00
See application file for complete search history.

(56) References Cited

U.S. PATENT DOCUMENTS

| | | |
|---|---|---|
| 2003/0074461 A1 | 4/2003 | Kang et al. |
| 2010/0029272 A1* | 2/2010 | McCann et al. ............. 455/433 |
| 2012/0040690 A1* | 2/2012 | Zhao et al. ................. 455/456.1 |

FOREIGN PATENT DOCUMENTS

| | | |
|---|---|---|
| CN | 1801764 A | 7/2006 |
| CN | 1972225 A | 5/2007 |
| CN | 101132603 A | 2/2008 |
| JP | 2008312191 A | 12/2008 |
| JP | 2010534005 A | 10/2010 |
| JP | 2013509837 A | 3/2013 |
| WO | 03032607 A2 | 4/2003 |

OTHER PUBLICATIONS

International Search Report on international application No. PCT/CN2010/071839, mailed on Aug. 5, 2010.
English Translation of the Written Opinion of the International Search Authority in international application No. PCT/CN2010/071839, mailed on Aug. 5, 2010.
ITU-T Y.2015 Sep. 30, 2009.
ITU-T Y.2022 Aug. 2011.

* cited by examiner

*Primary Examiner* — Erika A Washington
(74) *Attorney, Agent, or Firm* — Oppedahl Patent Law Firm LLC

(57) ABSTRACT

A method and system for implementing information interaction in a Next Generation Network are disclosed. The method comprises that: a Service Control Function (SCF) sends a location query request message to a ID/Locator Mapping Functional Entity (ILM-FE); the ILM-FE feeds back to the SCF a location query response message, which includes location information and/or information about a characteristic of an IP connection session accessing the service control function. The service control layer utilizes ID/locator separation technology to control the service layer, and uses the characteristic that the user identifier does not change along with the mobile location to provide a rapid transmission location management for a terminal in a moving process. Thus, the service control based on a user identifier is implemented in the NGN, and the continuity of user service is assured when the IP address of the user changes due to the mobility or the multi-homing.

7 Claims, 5 Drawing Sheets

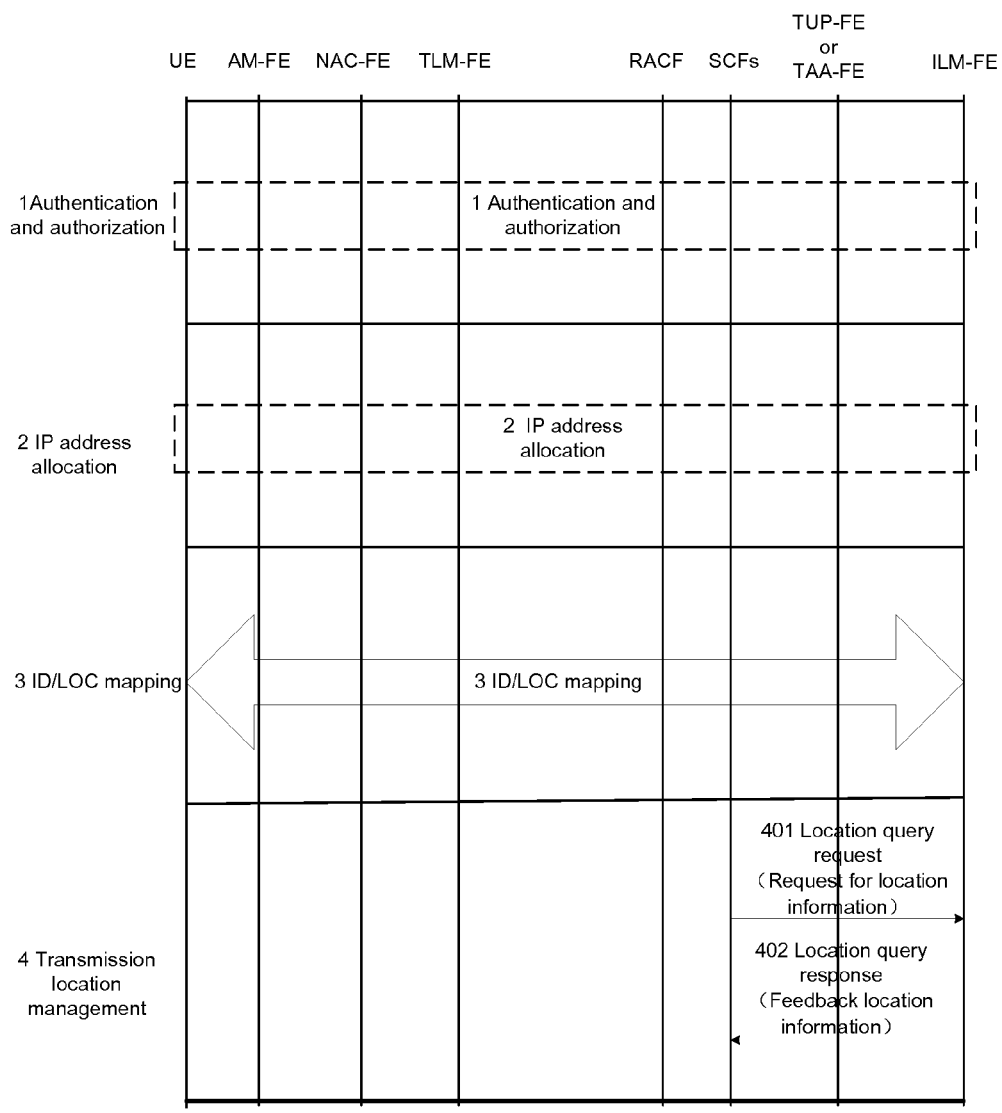

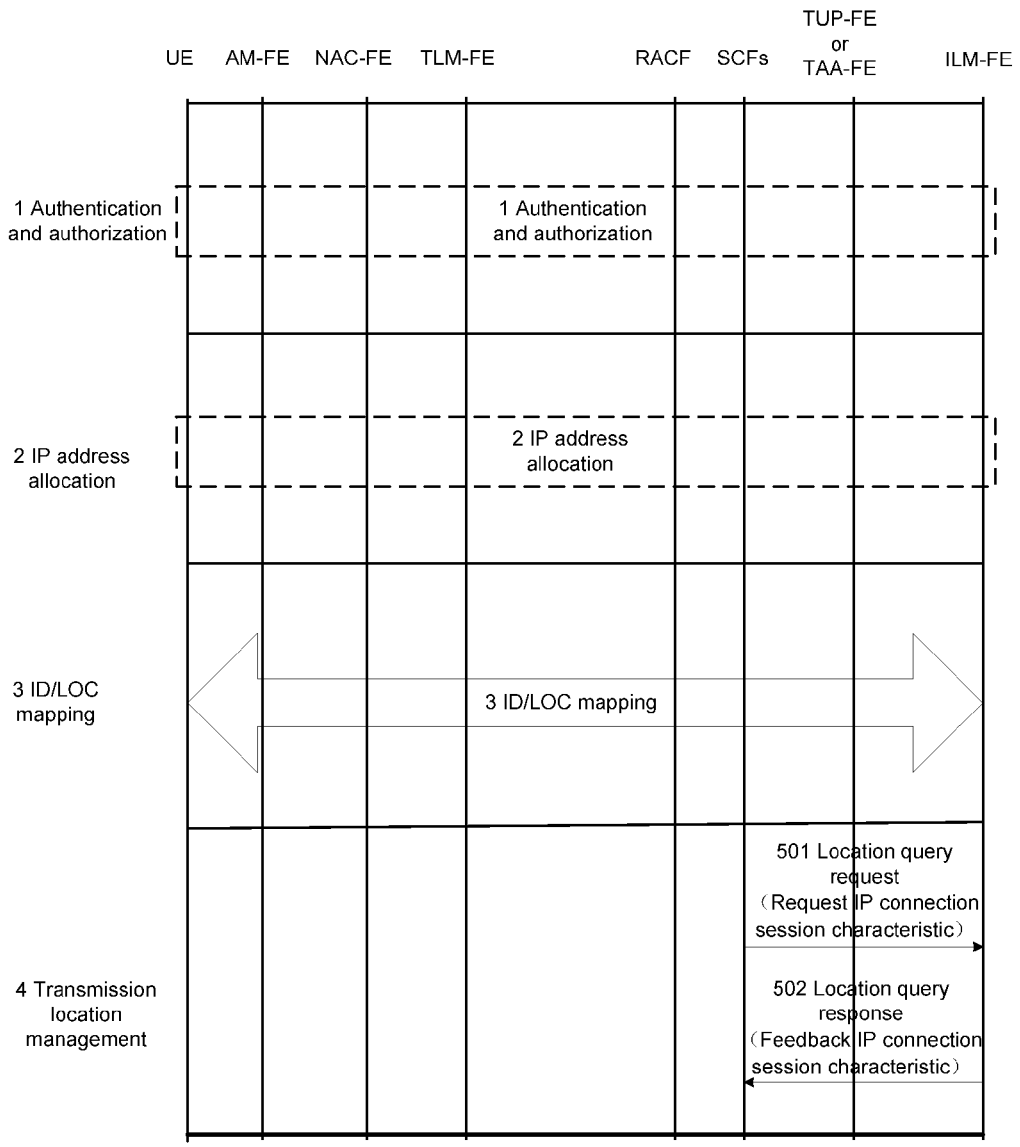

METHOD AND SYSTEM FOR IMPLEMENTING INFORMATION INTERACTION IN A NEXT GENERATION NETWORK

TECHNICAL FIELD

The disclosure relates to the field of communications, and in particular to a method and system for implementing information interaction in a next generation network based on an ID/locator separation.

BACKGROUND

Each layer protocol entity in each layer structure of the existing Internet except the physical layer has its own name space, comprising a MAC address of a link layer, an IP address of a network layer, an IP address and a port number of a transmission layer and a domain name of an application layer. In theses name spaces, the MAC address is unique in a subnet only and the port number is unique in a host only; thus, two important global name spaces, i.e., the IP address and the domain name exist in the Internet. The domain name and the IP address realize analysis through DNS. In such kind of name spaces structure, the IP address has a dual-function of acting as the location identifier of communication terminal host network interface of network layer in network topology and also acting as the identity of transmission layer host network interface.

The TCP/IP protocol does not consider the mobility of host at the beginning of the design; along with the development of Next Generation Networks (NGN), the user mobility and host multihoming problems become more and more common and the semantic overload defects of such kind of IP address are increasingly clear. When the IP address of a host changes, both the route and the identity of communication terminal host change; the change of route is acceptable, but the change of host identifier will cause the interruption of application and connection.

The industry presents an ID/Locator Separation (IPSPLIT, ID/locator separation in NGN) technology for supporting the mobility and multihoming and supporting the calling continuity. The IPSPLIT technology takes a host identifier (Host ID) as the identity of host, which uniquely marks each host connected to Internet globally. It aims at separating the transmission layer from the network layer, providing a secure host mobility and multihomed method for the Internet, and providing an encrypted host identifier name space for easy authentication of communication parts and implementing a secure, reliable network system. In an IPSPLIT network, the IP address only represents the routing location of communication terminal host in network topology. The technology solves the semantic overload problem of IP address, separates the dual-function of IP address and realizes the support to problems of multi-mobility, multihoming, IP address dynamic reassignment and access between different network regions.

The IPSPLIT technology is based on the NGN. In the IPSPLIT network, a user may be mobile or multihomed; and then a IP address of the user is not uniquely assigned; a host identifier is corresponding to a plurality of IP addresses. Therefore, the multihoming and mobility problems are solved. The host identifier of a multihoming device corresponds to a plurality of IP addresses; if an IP address is unusable, or a better IP address exists, the built transmission layer connection may be transferred to other IP addresses easily. The IP address may change due to the mobility of host, however, the host identifier does not change, consequently, the connection of transmission layers do not have to be interrupted, but the moved node should know the change of IP address. The transmission layer connection is bound with the host identifier and the IP address is only used in routing. Thus, the IPSPLIT technology implements the exchange access of different network regions, such as the public network and the private network, the IPv4 network and the IPv6 network.

The NGN system structure is as shown in FIG. 1, comprising a network access control part, a resource control part, a transport part, a service control part and a user terminal/user network part.

The network access control part provides functions of a registration, an authentication and authorization, an address assignment, a parameter allocation and a location management, etc., for a user terminal/user network of the NGN network, such as the network attachment control functions in an ITU-T NGN network;

the resource control part fulfills functions of a admission control, a resource reservation, etc. when a user terminal/user network accesses to the network based on a strategy and network resource state, such as resource and admission control functions in TU-T NGN network, access management functions in the NGN;

the transport part fulfills the information transport function, such as transport functions in the ITU-T NGN network;

a service control part belongs to a part of the service layer and fulfills in service layer the functions of a registration, an authentication and authorization, a resource control, etc., such as the service terminal authentication and authorization processes in the ITU-T NGN network;

a user terminal/user network part provides a network access function for a user, such as a user equipment in the ITU-T NGN network;

The NGN system structure based on the IPSPLIT is as shown in FIG. 2, wherein the functions of the network access control part, the resource control part, the transport part, the service control part and the user terminal/user network part are consistent with that in the conventional NGN system. The ID/locator separation control part is a special functional part of the NGN system structure based on the IPSPLIT.

The NGN system functional frame based on the IPSPLIT is as shown in FIG. 3, the function of each functional entity are as the follows:

a Transport User Profile Functional Entity (TUP-FE) is used for storing user information related to the transport layer;

a Transport Authentication And Authorization Functional Entity (TAA-FE) is configured to provide a transport layer authentication and authorization function and check the network access authentication and authorization of a user based on the user information;

an Access Management Functional Entity (AM-FE) is configured to apply a translation conversion to a network access request initiated by a user and send the request of assigning IP address and other network allocation parameters to a NAC-FE;

a Transport Location Management Functional Entity (TLM-FE) is configured to register an IP address assigned to a user and other network location information provided by the NAC-FE;

a network access configuration functional entity (NAC-FE) is configured to assign an IP address for a user terminal, and possibly assign other network allocation parameters for a user terminal, such as an address of a DNS server and an address of a signaling agency etc.

an ID/Locator mapping functional entity (ILM-FE, Id-loc-Mapping Functional Entity) is configured to store a mapping and a dynamic update of an ID/LOC.

The transmission location management in the NGN is implemented through the interaction of the service control layer (SCF) and the TLM-FE. The SCF obtains a characteristic of an IP connection session needed in a service control, such as network location information of a user, an IP address of a user, a characteristic of a UE and a SCF characteristic. The implementation process of the transmission location management in NGN is as shown in Steps 301-302 in FIG. 4. The SCF inquires a transmission location from the TLM-FE and the TLM-FE sends the transmission location response to the SCF.

The transmission layer service control process is implemented through the interaction between the SCF and the TLM-FE in the process. In the NGN network based on the ID/locator separation, if the transmission layer service control process manages the transmission location through the SCF and the TLM-FE, defects thereof are as the follows:

firstly, only one IP address exists at the same moment as for the TLM-FE; in the NGN network based on the ID/locator separation, multiple usable IP addresses exist at the same moment as for a multihoming user, which means that the service control layer can select one from the multiple usable IP addresses;

secondly, in the NGN network based on the ID/locator separation, the transmission service control layer manages a location through a user identifier of a user; thus, the user identifier will not change even when the user location changes, ensuring the service contiguity. In the NGN network based on the ID/locator separation, the TLM-FE is not in charge of storing the user identifier; if the location management is executed through the user identifier, the service transmission layer service control process is impossible to manages transmission location through the SCF and the TLM-FE.

SUMMARY

The technical problem to be solved by the disclosure is to provide a method and system for implementing information interaction in a next generation network, so as to solve the problem of existing transmission location management failing to implement a transmission location management between a SCF and a TLM-FE based on an ID/locator separation technology.

To solve the problem above, the disclosure provides a method for implementing information interaction in a next generation network, which includes:

a Service Control Function (SCF) sending a location query request message to an ID/Locator Mapping Functional Entity (ILM-FE); and the ILM-FE feeding back a location query response message to the SCF, wherein the location query response message includes location information and/or information about the characteristic of the Internet Protocol (IP) connection session accessing the service control function.

Preferably, the location query response message may further include a service control function characteristic and/or a transmission subscription identifier.

Preferably, the location information may comprise a user identifier and/or an IP address assigned to a user equipment.

To solve the problem above, the disclosure provides a system for implementing information interaction in a next generation network, which includes a service control function (SCF) and an ID/Locator mapping functional entity (ILM-FE).

The SCF is configured to send a location query request message to the ID/Locator mapping functional entity (ILM-FE);

the ILM-FE is configured to feed back a location query response message to the SCF; and the location query response message includes location information and/or information about a characteristic of an Internet protocol (IP) connection session accessing the service control function.

Preferably, the location query response message may further include the service control function characteristic and/or the transmission subscription identifier.

Preferably, the location information may comprise a user identifier and/or an IP address assigned to a user equipment.

To solve the problem above, the disclosure provides the service control function (SCF) supporting information interaction in a next generation network, which includes a sending module and a receiving module.

The sending module is configured to send a location query request message to an ID/Locator Mapping Functional Entity (ILM-FE);

the receiving module is configured to receive a location query response message fed back by the ILM-FE; and the location query response message includes the location information and/or the information about the characteristic of the Internet Protocol (IP) connection session accessing the service control function.

In the disclosure, the transmission location management is performed based on signaling interaction between the SCF and the ILM-FE, enabling a service control layer to control a service layer based on the ID/locator separation technology, and providing a rapid transmission location management for terminals in moving process based on the characteristic of user identifiers of being independent of moving locations. Accordingly, a service control based on user identifiers is implemented in an NGN network, ensuring the continuity of service when IP address of user changes due to the mobility or the multihoming.

BRIEF DESCRIPTION OF THE DRAWINGS

FIG. 5 shows a transmission location information in an NGN based on IPSPLIT; and FIG. 6 shows the transmission IP connection session characteristic in an NGN based on IPSPLIT.

DETAILED DESCRIPTION

Figure 1:
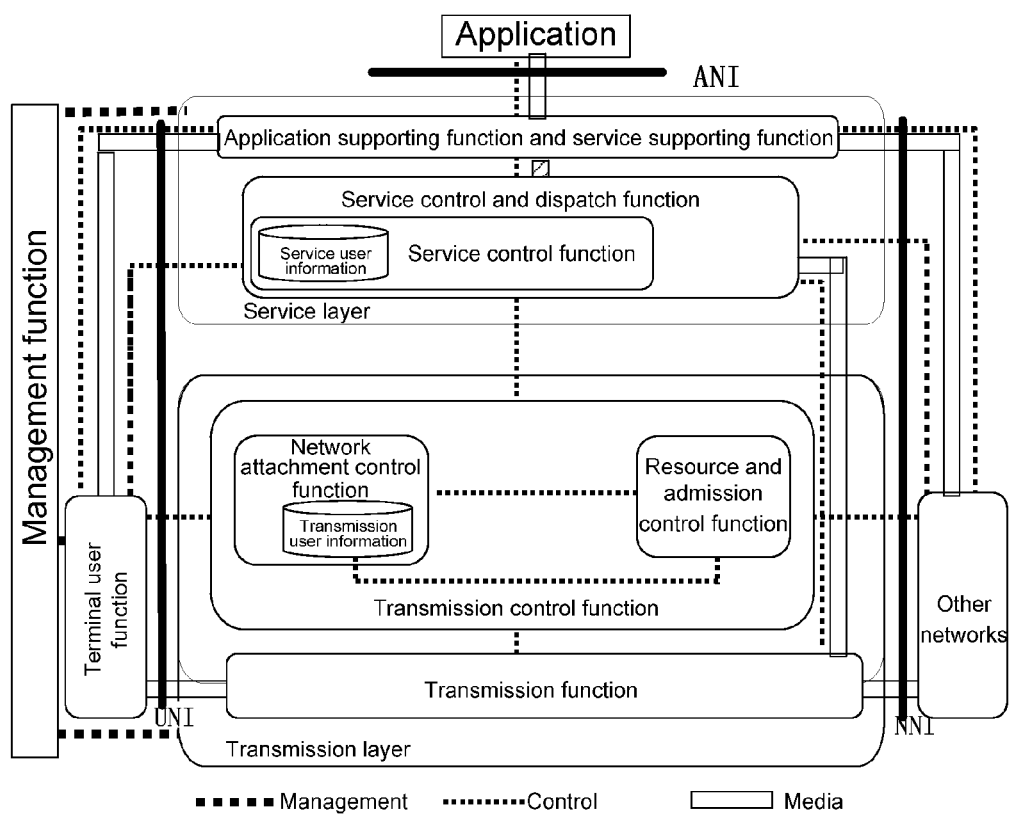
FIG. 1 shows a structure of an NGN system.
Figure 2:
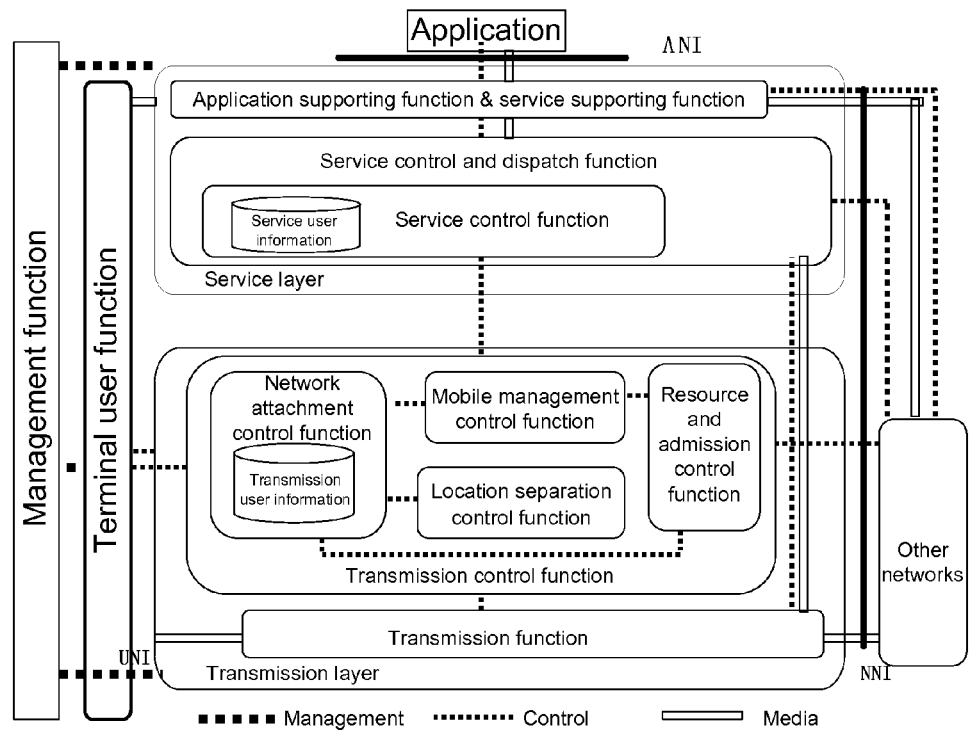
FIG. 2 shows a structure of an IPSPLIT-based NGN system.

In order to make the purpose, the technical solutions and advantages of the invention clearer, the disclosure is described in the following with reference to the accompanying drawings and embodiments in detail.

A method and system for implementing information interaction in an NGN based on the ID/locator separation is presented in the disclosure to overcome the transmission location management defect of the existing NGN network, i.e., the inability to use the IPSPLIT technology in the transmission location management based on the SCF and the ILM-FE. Since in an NGN network based on the ID/locator separation, the ILM-FE stores both a mapping of ID/LOC and user identifiers of users, the disclosure provides performing transmission location management through the signaling interaction between the SCF and the ILM-FE, in which a service control layer can control a service layer through the ID/locator separation technology. Accordingly, rapid transmission location management for terminals in moving process can be implemented based on the characteristic of user identifiers of being independent of moving locations.

The disclosure provides a method for implementing information interaction in a next generation network, which includes the following steps:

a Service Control Function (SCF) sends a location query request message to an ID/Locator Mapping Functional Entity (ILM-FE); and the ILM-FE feeds back a location query response message to the SCF, wherein the location query response message includes location information and/or information about the characteristic of the Internet Protocol (IP) connection session accessing the service control function.

The information for interaction between the SCF and the ILM-FE through the location query request message and the location query response message comprises the location information, the information of an IP connection session characteristic; and may further comprise a service control function characteristic and/or a transmission subscription identifier. The location information comprises a user identifier, and/or an IP address assigned to user equipment.

Information fed back to the SCF by the ID/Locator Mapping Functional Entity (ILM-FE) depends on specific request information contents of request signalling, which is different according to different specific request information contents.

For example, in the NGN network based on the ID/locator separation, when the NGN service control function obtains the location information from the ILM-FE, it is implemented through the interaction based on a location query request signalling and a location query response signalling; and the specific request information and response information are location information related to a location, such as a user identifier or an IP address.

For example, in the NGN network based on an ID/locator separation, when the NGN service control function obtains a characteristic of an IP connection session needed in the service control from ILM-FE, it is implemented through the interaction based on the location query request signalling and the location query response signalling; and the specific request information and response information are the characteristic information of the IP connection session.

The disclosure further discloses a system for implementing information interaction in a next generation network, which includes a Service Control Function (SCF) and an ID/Locator Mapping Functional Entity (ILM-FE).

The SCF is configured to send a location query request message to the ID/locator Mapping Functional Entity (ILM-FE); and the ILM-FE is configured to feed back a location query response message to the SCF; the location query response message includes location information and/or information about the characteristic of the Internet Protocol (IP) connection session accessing the service control function.

The information for interaction between the SCF and the ILM-FE through the location query request and the location query response message comprises: the location information, the information of the IP connection session characteristic; and may further comprise a service control function characteristic and/or a transmission subscription identifier. The location information comprises a user identifier, and/or an IP address assigned to user equipment.

A Service Control Function (SCF), as described above, includes a sending module and a receiving module.

The sending module is configured to send a location query request message to an ID/Locator Mapping Functional Entity (ILM-FE); and the receiving module is configured to receive a location query response message fed back by the ILM-FE; the location query response message includes the location information and/or the information about the characteristic of the Internet Protocol (IP) connection session accessing the service control function.

Information fed back to SCF by ID/Locator Mapping Functional Entity (ILM-FE) depends on specific request information contents of request signalling, which is different according to different specific request information contents.

For example, in the NGN network based on the ID/locator separation, when the NGN service control function obtains the location information from the ILM-FE, it is implemented through the interaction based on the location query request signalling and the location query response signalling; and the specific request information and response information are the location information related to a location, such as a user identifier or an IP address.

For example, in the NGN network based on the ID/locator separation, when the NGN service control function obtains the characteristic of the IP connection session needed in the service control from the ILM-FE, it is implemented through the interaction based on the location query request signalling and the location query response signalling; and the specific request information and response information are the characteristic information of the IP connection session.

Figure 3:
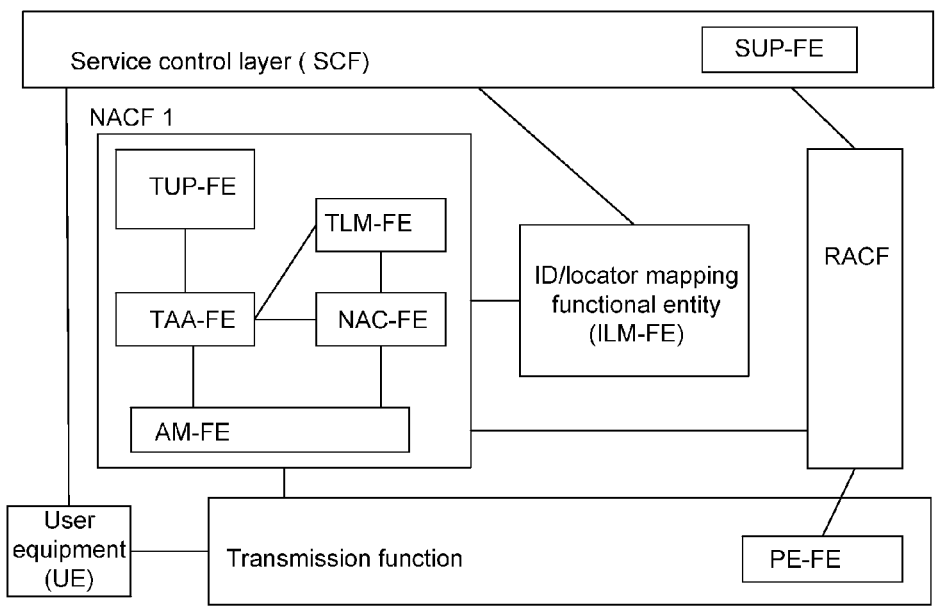
FIG. 3 shows a functional frame of an IPSPLIT-based NGN system.
Figure 4:
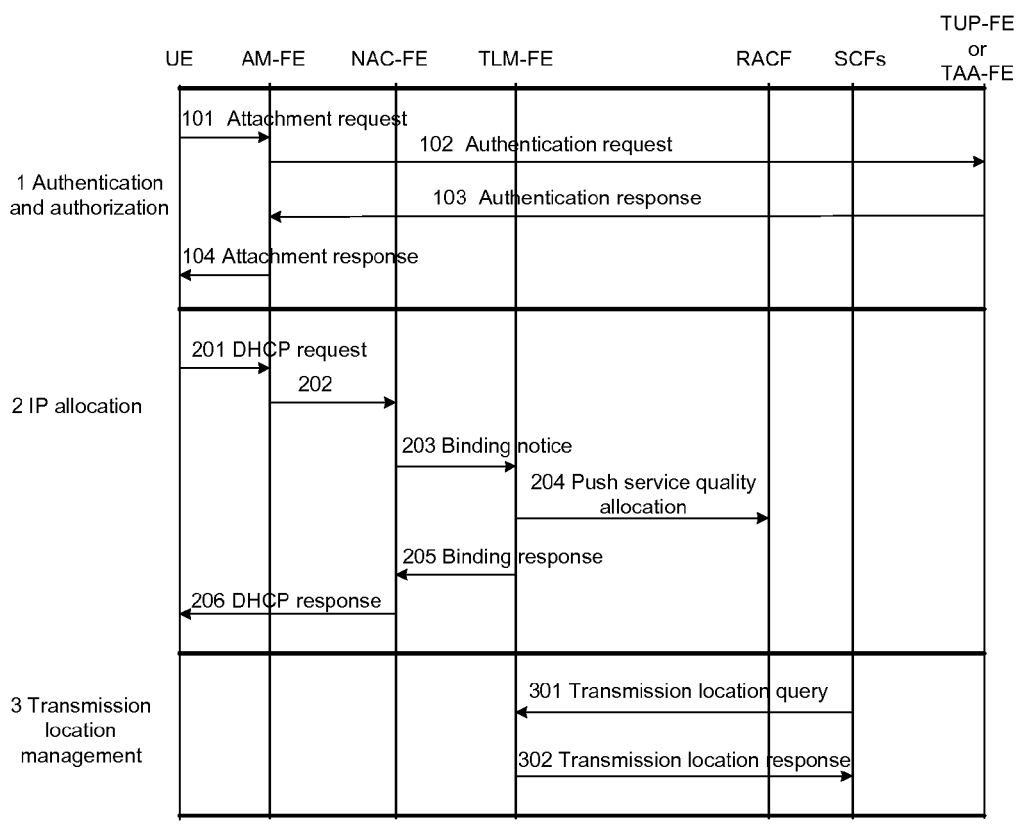
FIG. 4 shows a transmission location management in an NGN.

Furthermore, the system for implementing information interaction in a Next Generation Network (NGN), as shown in FIG. 3, further includes the follows:

a Transmission Layer User Profile Functional Entity (TUP-FE), configured to store user information related to a transport layer;

a Transport Authentication And Authorization Functional Entity (TAA-FE), configured to provide a transport layer authentication and authorization function and check the network access authentication and authorization of a user based on the user information;

an Access Management Functional Entity (AM-FE), configured to apply a translation conversion to a network access request initiated by a user and send the request of assigning an IP address and other network allocation parameters to the NAC-FE;

a Transport Location Management Functional Entity (TLM-FE), configured to register an IP address assigned to a user and other network location information provided by the NAC-FE;

a Network Access Configuration Functional Entity (NAC-FE), configured to assign an IP address for a user terminal, and possibly assign other network allocation parameters for a user terminal, such as an address of a DNS server and an address of a signaling agency.

Based on the application of the disclosure, the transmission location management is implemented through information interaction in the NGN network based on the ID/locator separation, ensuring the continuity of service when user IP address changes due to the mobility or the multihoming.

Embodiment 1

A method for an NGN Service Control Function (SCF) to obtain from an ID/Locator Mapping Functional Entity (ILM- EF) transmission location management information in a Next Generation Network (NGN) based on ID/locator separation is as shown in FIG. 5.

Step 1: Authentication and Authorization Processes.

A user equipment sends a network attachment request to an Access Management Functional Entity (AM-FE) and the AM-FE completes user authentication and authorization process via an ILM-FE.

Step 2: IP Address Assignation Process.

The IP address assignation process is the same as an IP address assignation process for terminals in a common NGN system, in which IP addresses can be obtained through either a self-assignation manner or a DHCP manner. The IP address assignation process includes: an UE sends an address request to a Network Access Configuration Functional Entity (NAC-FE) through DHCP; the NAC-FE pushes to the TLM-FE binding information comprising a temporary address assigned by the NACF and other related information, such as information related to logic, physical port address transmission. The TLM-FE pushes strategic information to the RACF and pushes binding information including an address to the NAC-FE; and the NAC-FE assigns a new IP address to the UE.

Steps 3: ID/LOC Mapping Process.

After the user obtains an IP address, a binding mapping between Host Identifiers (Host IDs) and location LOCs is executed in the ILM-FE. The mapping process can be initiated either by a terminal or by a network side. In case that the user is one of being mobility or multihoming, a user identifier (Host ID) at the same time or different times may correspond to a plurality of locations. In other words, the mapping binding between the user identifiers (Host IDs) and the location LOCs in the ILM-FE database may be one-to-one or one-to-multiple. This differs from a common NGN network in which, generally at the same time, only one IP address corresponds to one user in a TLM.

Step 4: transmission location management process.

Sub-step 401: the SCF sends a location query request to the ILM-FE to ask for location information;

Sub-step 402: the ILM-FE feeds back a location query response, which includes a user identifier (Host ID), to the SCF.

Embodiment 2

A method for an SCF to obtain from an ILM-FE characteristic of an IP connection session, such as information query of user information, needed to perform a service control is as shown in FIG. 6.

Step 1: Authentication and Authorization Processes.

A user equipment sends a network attachment request to an Access Management Functional Entity (AM-FE) and the AM-FE completes a user authentication and authorization process via an ILM-FE.

Step 2: IP Address Assignation Process.

The IP address assignation process is the same as an IP address assignation process for terminals in a common NGN system, in which IP addresses can be obtained through either a self-assignation manner or a DHCP manner. The IP address assignation process includes that: an UE sends an address request to a Network Access Configuration Functional Entity (NAC-FE) through a DHCP; the NAC-FE pushes to the TLM-FE binding information comprising a temporary address assigned by the NACF and other related information, such as information related to logic, physical port address transmission. The TLM-FE pushes strategic information to the RACF and pushes binding information including an address to the NAC-FE; and the NAC-FE assigns a new IP address to the UE.

Steps 3: ID/LOC Mapping Process.

After the user obtains an IP address, a binding mapping between Host Identifiers (Host IDs) and location LOCs is executed in the ILM-FE. The mapping process can be initiated either by a terminal or by a network side. In case that the user is one of being mobility or multihoming, a user identifier (Host ID) at the same time or different times may correspond to a plurality of locations. In other words, the mapping binding between the user identifiers (Host IDs) and the location LOCs in the ILM-FE database may be one-to-one or one-to-multiple. This differs from a common NGN network in which, generally at the same time, only one IP address corresponds to one user in a TLM.

Step 4: Transmission Location Management Process.

Sub-step 501: the SCF sends a location query request to the ILSM-FE to request to obtain a characteristic of an IP connection session;

Sub-step 502: the ILM-FE feeds back to the SCF a location query response including the characteristic of the IP connection session needed by the SCF, such as a logical connection identifier, a physical connection identifier and a type of access network.

Although the disclosure is described with reference to specific embodiments, it should be understood that, to those skilled in the art, any modifications and changes may be made without deviating from the scope of the disclosure. And such kind of modifications and changes shall fall into the scope of protection of the disclosure and the appended claims.

INDUSTRIAL PRACTICALITY

The disclosure discloses a method and system for implementing the information interaction in a next generation network, which performs a transmission location management through the signaling interaction between the SCF and the ILM-FE, enables a service control layer to control a service layer through the ID/locator separation technology, and provides a rapid transmission location management of a terminal in moving process based on the characteristic of a user identifier of not changing along with the moving location. The service control is implemented based on a user identifier in an NGN network, ensuring the continuity of service when an IP address of a user changes due to the mobility or the multihoming.

The invention claimed is:

1. A method for managing transmission locations in an IPSPLIT-based next generation network, comprising:
    sending, by a Service Control Function (SCF), a location query request message to an ID/Locator Mapping Functional Entity (ILM-FE); and
    feeding back, by the ILM-FE, a location query response message to the SCF, wherein the location query response message includes location information and/or information about a characteristic of an Internet Protocol (IP) connection session accessing the service control function.

2. The method according to claim 1, wherein the location query response message further includes a service control function characteristic and/or a transmission subscription identifier.

3. The method according to claim 1, wherein the location information comprises a user identifier and/or an IP address assigned to a user equipment.

4. A system for managing transmission locations in an IPSPLIT-based next generation network, comprising a Service Control Function (SCF) and an ID/Locator Mapping Functional Entity (ILM-FE), wherein
- the SCF is configured to send a location query request message to the ILM-FE;
- the ILM-FE is configured to feed back a location query response message to the SCF; and
- the location query response message includes location information and/or information about a characteristic of an Internet Protocol (IP) connection session accessing the service control function.

5. The system according to claim 4, wherein the location query response message further includes a service control function characteristic and/or a transmission subscription identifier.

6. The system according to claim 4, wherein the location information comprises a user identifier and/or an IP address assigned to a user equipment.

7. A Service Control Function (SCF) supporting transmission location management in an IPSPLIT-based next generation network, comprising a sending module and a receiving module, wherein
- the sending module is configured to send a location query request message to an ID/Locator Mapping Functional Entity (ILM-FE);
- the receiving module is configured to receive a location query response message fed back by the ILM-FE; and
- the location query response message includes location information and/or information about a characteristic of an Internet Protocol (IP) connection session accessing the service control function.

* * * * *